United States Patent [19]

Chao et al.

[11] Patent Number: 5,330,560

[45] Date of Patent: Jul. 19, 1994

[54] SUPPORTED SORBENTS FOR REMOVAL AND RECOVERY OF ARSENIC FROM GASES

[75] Inventors: Sherman S. Chao, Indian Head Park; Amir Attari, Barrington, both of Ill.

[73] Assignee: Gas Research Institute, Chicago, Ill.

[21] Appl. No.: 38,965

[22] Filed: Mar. 29, 1993

[51] Int. Cl.$^5$ .............................................. B01D 53/04
[52] U.S. Cl. ........................................ 95/95; 95/114; 95/133; 95/143; 95/900; 95/902
[58] Field of Search ................. 95/133, 143, 147, 148, 95/900, 902, 95, 114

[56] References Cited

U.S. PATENT DOCUMENTS

| | | | |
|---|---|---|---|
| 3,037,338 | 6/1962 | Thomas | 95/143 X |
| 3,782,076 | 1/1974 | Carr et al. | 95/133 |
| 3,789,581 | 2/1974 | Carr et al. | 95/133 X |
| 3,812,652 | 5/1974 | Carr et al. | 95/133 |
| 3,812,653 | 5/1974 | Massoth et al. | 95/133 |
| 4,578,256 | 3/1986 | Nishino et al. | 95/133 X |
| 4,861,939 | 8/1989 | Debras et al. | 95/133 X |
| 4,869,735 | 9/1989 | Miyazawa et al. | 95/133 |
| 4,971,608 | 11/1990 | Tooley et al. | 95/900 X |
| 5,024,683 | 6/1991 | Tooley et al. | 95/900 X |
| 5,126,117 | 6/1992 | Schumacher et al. | 95/133 X |

FOREIGN PATENT DOCUMENTS 0082989 7/1983 European Pat. Off. .............. 95/133

*Primary Examiner*—Robert Spitzer
*Attorney, Agent, or Firm*—Speckman, Pauley & Fejer

[57] ABSTRACT

A process for removal and recovery of arsenic from a gas comprising contacting a supported sorbent with an arsenic-containing gas, adsorbing the arsenic with the supported sorbent, desorbing the arsenic from the supported sorbent, and collecting the desorbed arsenic.

12 Claims, No Drawings

SUPPORTED SORBENTS FOR REMOVAL AND RECOVERY OF ARSENIC FROM GASES

BACKGROUND OF THE INVENTION

1. Field of the Invention

This invention relates to a process for removing and recovering arsenic-containing compounds from gases. In particular, this invention relates to a process for removing and recovering organoarsines from gases, in particular, natural gas.

Arsenic-containing compounds in the form of gases have recently been found in natural gas pipelines and in natural gas fields. These compounds have been identified as predominately trimethylarsine (TMA), ethyldimethylarsine, diethylmethylarsine and triethylarsine. Reported concentrations of total arsenic varies from a few ug/m$^3$ to two mg/m$^3$. Because of operational problems caused by the formation of corresponding trialkylarsine sulfide residues on many pressure and flow regulation devices in the natural gas distribution system as well as the environmental significance of arsenic, a process for efficient removal of arsenic to reduce the concentration of these types of constituents in natural gas to a level that is acceptable on the basis of present process and toxicological knowledge is required.

2. Description of Prior Art

At the present time, known processes for removal of arsenic from gas streams are costly and/or generally ineffective. One such process is the Parker copper oxide/zinc oxide catalytic process which was originally developed to remove arsenic, in particular inorganic arsine, from the gas stream at high temperature. This process requires that the gas to be treated be preprocessed to remove water and sulfur species because the catalyst is reactive to water at the processing temperature and is also somewhat specific for sulfur resulting in competitive binding of sulfur for the arsenic sites resulting in a probable reduction in catalyst life. Furthermore, the arsenic deposited on the exhausted catalyst cannot be recovered easily, posing an environmental disposal problem.

In addition, several methods for analyzing the amount of arsenic in gas are known. One such method is the use of nitric acid to extract arsenic from natural gas and atomic spectroscopic techniques to determine the concentration of arsenic in the extract. This method provides a means for determining total arsenic in natural gas but is not a suitable field technique because it uses fragile glassware and concentrated nitric acid, the latter being a potential hazard to test personnel.

A second known method for determining the amount of total arsenic in gas is the NIOSH-approved air sampling method which utilizes coconut charcoal tubes to collect arsenic compounds from natural gas and X-ray fluorescence (XRF) and Neutron Activation Analysis (NAA) techniques to determine the amount of arsenic on the charcoal. However, this method is known to produce inconsistent results due to the fact that the efficiency of the charcoal tubes for collection of arsenic compounds from natural gas is substantially reduced due to much higher adsorption affinity of some natural gas components, such as heavier hydrocarbons, to the charcoal surfaces than the arsenic compounds. As a result, the arsenic content of the gas is not fully captured by the charcoal as it passes through the charcoal tubes, resulting in a significant loss of sample. Thus, it is apparent that this method also is not suitable for use in removing and recovering arsenic from gases.

Another known method for determining total arsenic in gas is the peroxydisulfate method for determining total trimethylarsine in which a saturated solution of potassium peroxydisulfate is used to extract the arsenic-containing compounds from a gas containing such compounds. The arsenic can be extracted by static or dynamic methods. The static batch extraction method recovers arsenic quantitatively from the gas by shaking a fixed volume of gas collected at atmospheric pressure with 10 ml. of extractant in a gas collection vessel for more than one hour. The dynamic method uses liquid extraction vessels through which the gas is bubbled through an extraction liquid. However, this method of arsenic recovery is not effective because the recovery of arsenic depends too much on the pH of the extraction liquid and the rate of sparging.

SUMMARY OF THE INVENTION

It is an object of this invention to provide a simple and effective process for removal and recovery of arsenic-containing compounds, in particular organoarsines, from gases.

It is an object of this invention to provide a process for removal of arsenic-containing compounds from natural gas.

It is yet another object of this invention to provide a process for removal of arsenic-containing compounds from natural gas, which process is both cost effective and environmentally safe.

It is yet another object of this invention to provide a process for removal of arsenic-containing compounds from natural gas which can be carried out at ambient temperatures.

These and other objects of this invention are achieved by a process for removal and recovery of arsenic from a gas in accordance with one embodiment of this invention comprising contacting a supported sorbent with said arsenic-containing gas, one of adsorbing and absorbing said arsenic with said supported sorbent, desorbing said arsenic from said supported sorbent, and collecting said desorbed arsenic. By the term "supported sorbent" as used throughout the specification and claims, we mean an inert solid support coated with a sorbent suitable for adsorbing and/or absorbing arsenic. By the term "coated", we mean the sorbent "disposed on the surface and/or within the pores" of an inert solid support. In accordance with one embodiment of this invention, the supported sorbent comprises an inert solid support coated with at least one metal halide. In accordance with another embodiment of this invention, the supported sorbent comprises an inert solid support coated with phosphoric acid. A significant feature of this process is that it can be carried out at ambient temperatures.

It will be apparent to those skilled in the art that the process of this invention, in addition to removal and recovery of arsenic from a gas, is also suitable for determining the concentration of arsenic in a gas. The supported sorbent is contacted with the arsenic-containing gas whereby the arsenic is collected on the supported sorbent and, in the case of trace amounts of arsenic, concentrated for purposes of analysis.

These and other objects and features of this invention will be better understood from the following detailed description.

DESCRIPTION OF PREFERRED EMBODIMENTS

The process for removal and recovery of arsenic from a gas in accordance with a preferred embodiment of the process of this invention comprises contacting a supported sorbent comprising an inert solid support coated with at least one metal halide with an arsenic-containing gas. In accordance with a particularly preferred embodiment of the process of this invention, the supported sorbent comprises an inert solid support coated with a transition metal halide, preferably selected from the group consisting of ferric chloride and cupric chloride.

In accordance with another preferred embodiment of the process of this invention, the supported sorbent comprises an inert solid support coated with phosphoric acid.

The inert solid support is preferably not specific to hydrocarbons and in the form of an aluminum silicate, molecular sieve or zeolite which in accordance with one embodiment of this invention may be packed in a column through which the arsenic-containing gas can be passed to effectively collect the organoarsines contained in said gas at ambient temperature. However, it will be apparent to those skilled in the art that other inert solid supports, such as glass beads, may also be utilized. Arsenic collected by the sorbent comprising transition metal halides can be recovered easily by washing the supported sorbent with water or an acidic aqueous solution. Arsenic collected by the sorbent comprising phosphoric acid can be recovered by means of water leaching, thermal desorption or pressure swing desorption. Although porous inert solid material of virtually any shape may be used as a support for the sorbent, inert solids having a particle size in the range of about $\frac{1}{4}$" to 60 mesh are preferred. Even more preferred for gas processing in accordance with the process of this invention are inert solids having a particle size in the range of about $\frac{1}{4}$" to 1/32". In this way, sufficiently high volumes of gas can be processed in a short period of time without reducing the efficiency of removal of arsenic from the gas.

As previously stated, the supported sorbents in accordance with this invention are used to strip organoarsines from natural gas through gas-solid interaction. Arsenic adsorbed or absorbed by said solid sorbents can be recovered into a suitable medium for subsequent analysis or production of gallium arsenide, an essential material in the electronics industry.

To provide effective removal of arsenic-containing compounds from the gas brought in contact with the supported sorbent, the concentration of sorbent on the inert solid support is preferably in the range of about 0.5 to 50% by weight of said supported sorbent.

In order to coat the inert solid support with metal halides, such as ferric chloride and cupric chloride, the transition metal halides are dissolved with anhydrous oxygenated solvents and applied to the inert solid support. For supported sorbents utilizing an inert solid support coated with phosphoric acid, the phosphoric acid is mixed with water or alcohols. In both instances, upon coating of the inert solid support with the sorbent, the solvent is evaporated, leaving the sorbent disposed within the pores and on the surface of the inert solid support.

EXAMPLE I

Trimethylarsine (TMA) breakthrough studies using four sections of 1.5 cm length of supported sorbents packed in series in a 6 mm ID glass tubing and 1–2 ppmv TMA in nitrogen or natural gas were carried out at a flow rate of 0.5 L per minute for 80 minutes and at room temperature. The arsenic collected by each section was extracted with an acidic aqueous solution, recovered and determined by atomic spectroscopic methods. In no case did arsenic break through the first section of sorbent. More than 95% of the arsenic in the gas was recovered from the first section by subsequent acid leaching.

EXAMPLE II

Microscale continuous laboratory bench studies conducted at room temperature and using 2 ppmv trimethylarsine (TMA) in natural gas showed a 5% breakthrough capacity of 1.9 and 1.1 trimethylarsine weight percent for 25% ferric chloride and 25% phosphoric acid sorbents, respectively, at a flow rate of 0.5 L per minute.

EXAMPLE III

In a similar study as Example II, trimethylarsine saturated on a phosphoric acid sorbent was desorbed by purging with an inert gas. We determined that the rate of desorption increases with increases in temperature, flow rate and degree of vacuum applied.

EXAMPLE IV

Two supported sorbents in accordance with this invention were evaluated against three other common sorbents with an on-line GC-AED breakthrough experimental set up using a 2.2 ppmv TMA-natural gas blend. The results of the sorbent capacity calculated at the 5% breakthrough are shown in Table 1. Both Sorbent #1 (10% FeCl$_3$) and Sorbent #5 (25% phosphoric acid) were shown to have higher sorbent capacities than the other three sorbents.

TABLE 1

| | Sorbent Capacity by Trimethylarsine (TMA) Breakthrough. | | | | |
|---|---|---|---|---|---|
| | Sorbent #1 | Sorbent #2 | Sorbent #3 | Sorbent #4 | Sorbent #5 |
| Description | 10% FeCl$_3$ | S-Impregnated carbon | Mn-containing sorbent | Mn-containing sorbent | 25% phosphoric acid |
| Wgt. of Sorbent (mg) | 25.7 | 51.3 | 18.1 | 17.6 | 19.5 |
| Flow Rate (ml/min.) | 433 | 479 | 488 | 506 | 491 |
| Breakthrough volume (L/g) | 0.69 | 0.066 | 0.23 | 0.17 | 0.94 |
| Capacity (mg/g) | 8.2 | 0.77 | 2.7 | 2.0 | 11.1 |

EXAMPLE V

In a separate experiment similar to Example IV using 2.0 ppmv TMA in natural gas at a flow rate of 0.5 L/min., a 5% breakthrough capacity of 19 mg TMA per gram of 25% FeCl$_3$ sorbent was determined, compared to 8.2 mg/g for 10% FeCl$_3$.

EXAMPLE VI

Experiments were conducted by passing 3 liters of 6 ppbv TMA in commercial methane through a one-quarter inch Pyrex sorbent tube packed with 80 mg of 25% phosphoric acid sorbent at a flow rate of 0.8 L/min. and then back-flushing (thermal desorbing) the tube three times (twice at 150° C. and once at 350° C.) into an Atomic Emission Detector (AED) to measure the sequential recovery of TMA. No measurable amount of residual arsenic compounds were detected during the second and third back-flushing. Based on these results, we concluded that at least 95% of the TMA was recovered during the first back-flushing. The relative standard deviation of recoveries from three independent replicate tests was 5.0%. These experiments demonstrate that the absorbed TMA can be recovered from the phosphoric acid sorbent by heating and the sorbent can be regenerated at the same time.

EXAMPLE VII

Seven experiments similar to Example VI were conducted in series but in a random order with 1 to 7 liters of the same 6 ppbv TMA blend. It was found that the amount of arsenic recovered increases proportionally with the amount absorbed on the sorbent.

EXAMPLE VIII

Experiments in accordance with Example VI were repeated with the 25% phosphoric acid sorbent preconditioned at 150° C. for one hour to remove moisture. It was found that the preconditioning enhanced the selectivity of the sorbent to TMA vs. sulfur compounds, increasing TMA removal capacity of the sorbent.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for removal and recovery of arsenic from a gas comprising the steps of:
    contacting a supported sorbent comprising an inert solid support coated with one of phosphoric acid and at least one metal halide with an arsenic-containing gas;
    one of adsorbing and absorbing said arsenic with said supported sorbent;
    desorbing said arsenic from said supported sorbent; and
    collecting said desorbed arsenic.

2. A process in accordance with claim 1, wherein said metal halide is a transition metal halide.

3. A process in accordance with claim 2, wherein said transition metal halide is selected from the group consisting of ferric chloride and cupric chloride.

4. A process in accordance with claim 1, wherein the concentration of said metal halide on said inert solid support is in the range of about 0.5–50 wt %.

5. A process in accordance with claim 1, wherein the concentration of said phosphoric acid on said inert solid support is in the range of about 0.5–50 wt %.

6. A process in accordance with claim 1, wherein said inert solid support has a particle size in the range of about ¼" to 60 mesh.

7. A process in accordance with claim 1, wherein said arsenic is desorbed and recovered by washing said supported chemical sorbent with one of water and an acidic aqueous solution.

8. A process in accordance with claim 1, wherein said arsenic is desorbed and recovered by one of water leaching, thermal desorption and pressure swing desorption.

9. A process in accordance with claim 1, wherein said metal halide is dissolved in an anhydrous oxygenated solvent.

10. A process in accordance with claim 1, wherein said phosphoric acid is mixed with at least one of water and an alcohol.

11. A process in accordance with claim 1, wherein said arsenic-containing gas is natural gas.

12. A process in accordance with claim 1, wherein said process is carried out at ambient temperature.

* * * * *